March 19, 1957 R. J. S. PIGOTT 2,785,457
MEANS FOR APPLYING CUTTING LIQUIDS AND
GREASES TO A LATHE TOOL
Filed Dec. 30, 1953 2 Sheets-Sheet 1
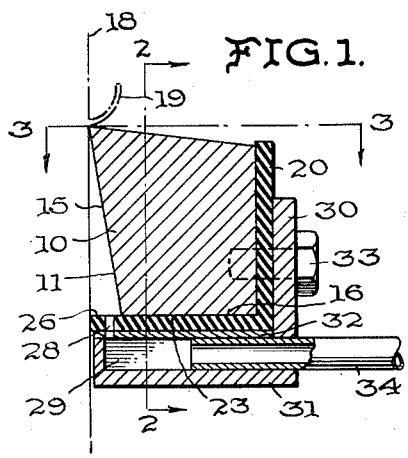
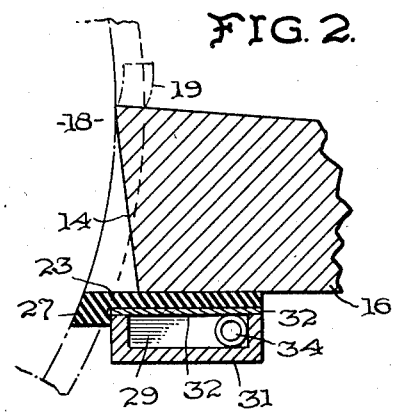
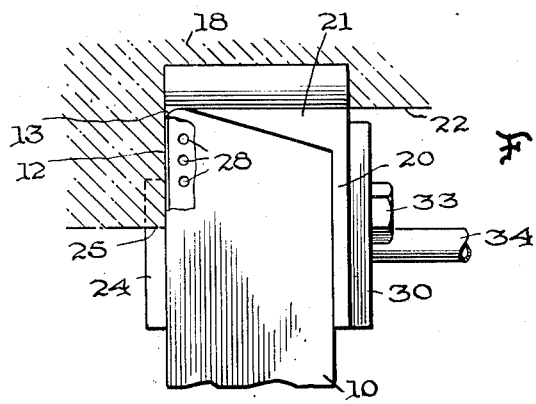
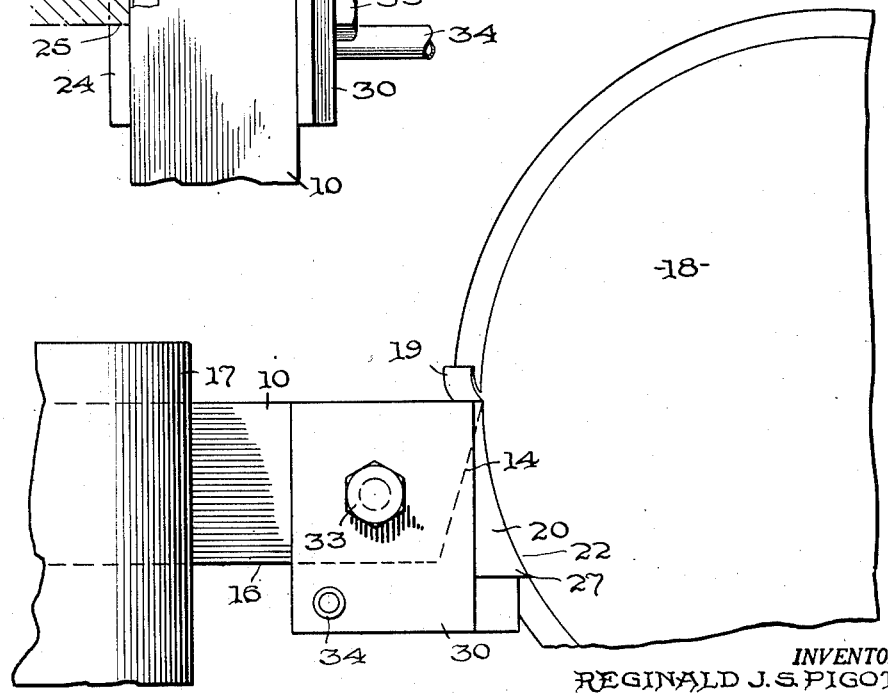
INVENTOR.
REGINALD J. S. PIGOTT
BY
*Horace H Cooke*
ATTORNEY March 19, 1957

R. J. S. PIGOTT 2,785,457

MEANS FOR APPLYING CUTTING LIQUIDS AND
GREASES TO A LATHE TOOL

Filed Dec. 30, 1953

INVENTOR.
REGINALD J. S. PIGOTT
BY
ATTORNEY

United States Patent Office 2,785,457
Patented Mar. 19, 1957

2,785,457

MEANS FOR APPLYING CUTTING LIQUIDS AND GREASES TO A LATHE TOOL

Reginald J. S. Pigott, Pittsburgh, Pa., assignor to Gulf Research & Development Company, Pittsburgh, Pa., a corporation of Delaware Application December 30, 1953, Serial No. 401,213

5 Claims. (Cl. 29—106)

This invention relates to means for applying cutting liquids and greases to a lathe tool or similar cutter, for cooling and lubricating its cutting edge, such means comprising a seal of molded rubber or other flexible material which embraces the end of the tool, leaving the cutting edge exposed, and which extends into sealing contact with the work around the point of cut to confine a space into which oil or grease is forced under pressure; all as will be described more particularly hereinafter, and as claimed.

It is common practice to apply oils and other liquids to cutting tools with a view to increasing the life of the tool over dry cutting. In seeking this desirable result it has for many years been the usual procedure to flow a heavy stream of coolant over the chip formed in cutting. Although some improvement resulted from so doing, the gain in tool life was disappointingly small compared to what should be expected in changing from dry to lubricated cutting, for in such a system the cutting edge is shielded by the chip which diverts the flow of liquid so that little of it reaches the highly heated region of the tool, and practically none of the coolant in such case penetrates to the cutting edge itself. Thus, in such a system the cooling and lubricating effects are inadequate.

More recently, the method of my Patent No. 2,653,517 has been instrumental in prolonging tool life as much as several hundred percent over that previously employed. Effective cooling and lubrication are achieved in that method by projecting a thin, high speed jet of cutting fluid from beneath the tool into the wedge-shaped clearance space between the tool and cut surface of the work. The jet, striking with high impact effect, gives rise to static pressure which is exerted on the fluid, here in vapor phase due to the high heat generated in cutting, to assist in forcing it across the cutting edge through interstitial openings of microscopic size between the tool and work which exist notwithstanding that the pressure at the line of cut may be and frequently is of the order of 50,000 pounds.

The fluid so jetted into the diminishing clearance between the tool and work must be directed with accuracy to impinge at or closely behind the cutting edge, for if it strikes the heel of the tool its energy is dissipated in splash. However, the nozzle from which the jet is directed is ordinarily mounted at a distance of several inches from the tool, and in some installations it must be adjusted from time to time when the jet becomes misdirected as a result of vibration or from other causes.

It is, accordingly, an object of the present invention to provide a confining flexible seal for lubricant which constitutes an attachment for the tool itself and which extends into sealing contact with the workpiece to confine the point of cut in order that lubricant under pressure may thus be packed around the heated end of the tool to insure against its misapplication.

Other objects and advantages of the invention will appear from the following description and drawings in which:

Figure 1 is a vertical cross-section through a lathe cutter and lubricant confining seal attachment, taken in a plane parallel with the axis of a workpiece.

Figure 2 is a vertical cross-section, taken along line 2—2 of Figure 1, in a plane extending longitudinally of the tool and transversely of the work.

Figure 3 is a horizontal view taken from the line 3—3 of Figure 1, the cutting edge of the tool being shown broken away.

Figure 4 is a side view.

Figure 5:
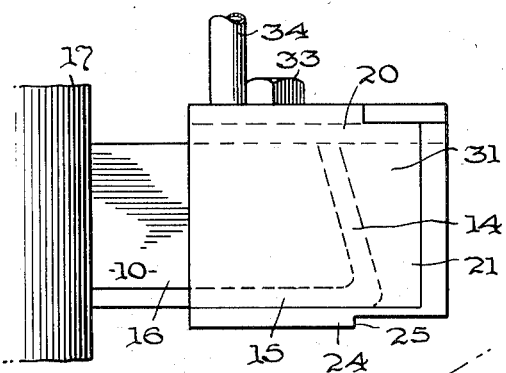
Figure 5 is a bottom view.

Referring more particularly to the drawings, the device of this invention is shown applied to a lathe cutting tool 10 of conventional shape, the face 11 of the tool being formed with a side cutting edge 12 terminating in a nose 13 from which the front and side flanks 14 and 15 slope inwardly to the base 16. The tool is clamped in a holder 17 and engages the workpiece 18 for a side cut to remove a continuously formed chip 19.

Figure 6:
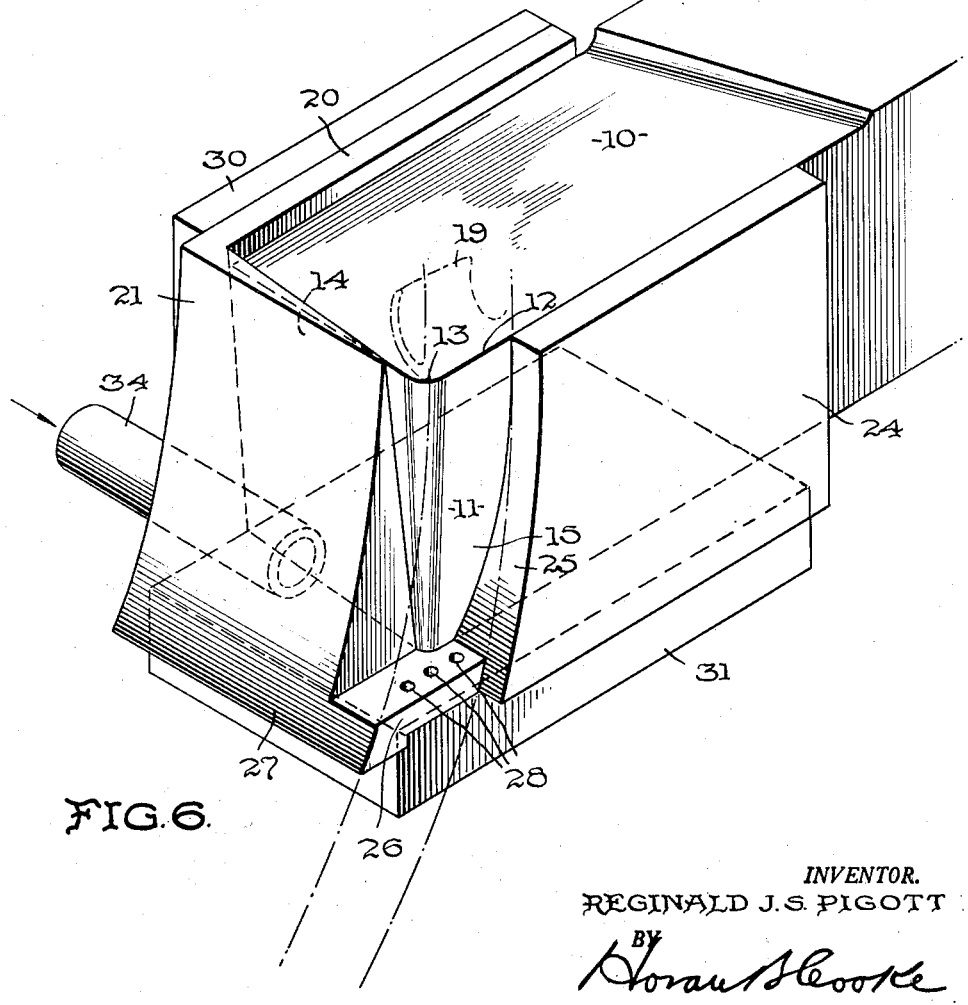
Figure 6 is a phantom isometric view.

The lubricant confining seal comprises a channel-like member of molded rubber or other suitable flexible material fitted to embrace the sides and end of the tool, but leaving the cutting edge and underlying flank portion of the tool exposed (Fig. 6). One side wall 20 of the seal extends along the shank of the tool on the side opposite the cutting edge 12 and terminates in a lateral end wall 21 of tapering thickness which conforms it to the relief angles of the tool in lateral direction and from top to base, the outer surface of the end wall 21 extending at right angles to the side wall and being arcuately curved in forward direction to bear against the reduced portion 22 of the workpiece.

The end wall of the seal tapers to a feather edge adjacent the nose of the tool and also increases in thickness from the nose downwardly to the bottom 23 of the seal which abuts the base of the tool.

The opposite side wall 24 of the channel-like seal has upwardly tapering thickness such that the sloping flank of the tool point, on the cutting side, is in contact with it. Back of the cutting edge 12, the wall 24 terminates in an arcuate edge 25 which lies alongside the cutting edge and extends into contact with the uncut portion of the work at one side of the line of cut as shown in Figure 3.

The bottom 23 of the seal bridges the gap between the side wall 24 and end wall 21, as at 26 (Figs. 1 and 6), and also extends forwardly beyond the base of the tool, merging with the front wall in a thickened lip 27 (Figs. 2 and 6) which bears upon the reduced surface of the workpiece transversely of the tool. Thus, the wedge-shaped clearance space between the tool flank and the cut surface of the work is sealed by the side walls of the channel member in contact with the work at either side of the line of cut and by the bottom of the channel member in contact with the work between the heel of the tool and the work surface.

A passageway 28 is provided in the bottom of the seal, communicating with the enclosed clearance space and with an underlying chamber 29 to which lubricant is supplied under pressure. The chamber 29 is formed by a generally L-shaped backing piece 30, the base 31 of which extends beneath the tool and which is either of hollowed block form or has an upstanding wall pressed into sealing engagement with an interposed rigid plate 32 which abuts the under side of the flexible channel member. The upright portion of the backing piece 30 is secured to the tool by a machine screw or the like 33, with the side wall 20 of the flexible seal compressed between them. Lubricant is supplied to the chamber 29 through a pipe 34 which is connected to a source under pressure, it being understood that the term "lubricant" as used herein has reference to any suitable cutting fluid or grease for cooling and lubricating the cutting edge of the tool.

What I claim as my invention is:

1. Means for applying lubricant to a cutting tool, comprising a flexible seal adapted to be mounted on the end of the tool and to extend into contact with a workpiece, said seal having a bottom abutting the base of the tool and upstanding side and end walls adapted to embrace the tool, one said side wall being separated from the end wall to expose the cutting edge of the tool and the adjacent sloping tool flank, the side and end walls adjacent such separation extending into sealing contact with the workpiece on each side of the line of cut and the bottom of the seal closing the gap provided by such separation, and means for introducing lubricant through the bottom of said seal into the space provided by the wall separation and further bounded by the sloping flank of the tool and the cut surface of the work opposed thereto.

2. Means for confining a body of lubricant contiguous to the cutting edge of a tool which is adapted to engage a workpiece at such an angle as to leave a wedge-shaped clearance therebetween, said means comprising a flexible channel-like member embracing the end portion of the tool and extending into sealing contact with a workpiece at both sides of and beneath the line of cut, the channel-like member having an opening in one side wall exposing the cutting edge of the tool and further having a bottom wall extending laterally beyond the base of the tool and into contact with the workpiece to enclose the wedge-shaped clearance space between the cut surface of the work and the tool flank, and means for admitting lubricant under pressure to such enclosed space.

3. Means for confining a body of lubricant contiguous to the cutting edge of a lathe tool, said means comprising a channel-like seal of molded flexible material embracing the end of a tool and having side, end and bottom walls, one side wall of said seal treminating at the cutting edge of the tool to expose the same and having edgewise contact with the uncut surface of the work, the other side wall of said seal projecting forwardly of the tool into contact with the reduced portion of the work and terminating in an end wall which extends across the end of the tool to the nose thereof and into sealing contact with the reduced portion of the work adjacent the line of cut, the bottom of said channel-like seal projecting forwardly beyond the end of the first said side wall and closing a wedge-shaped space defined by the sloping flank of the tool and cut surface of the work, a passageway in the bottom wall of said seal communicating with such wedge-shaped space, and means for discharging lubricant through such passageway into the wedge-shaped space and to the apex thereof at the line of cutting contact.

4. In combination with a lathe cutting tool having flank portions sloping away from the nose of the tool and a side cutting edge to afford clearance from the workpiece except at the line of cut, a seal for confining a body of lubricant in close proximity to the cutting edge of the tool, said seal comprising a flexible, molded member of rectangular shape having a channel therein conforming in shape to that of the tool and defining an end wall of tapering thickness terminating in a feather edge at the corner adjacent to the nose of the tool, the side wall of the channel which abuts the sloping side flank of the tool terminating at a distance back of the nose of the tool to expose the cutting edge and adjacent sloping flank portion, the terminal edge of said side wall being adapted to bear against the uncut surface of the workpiece at one side of the line of cut, and said end wall being adapted to bear upon the portion of the workpiece reduced by cutting, a lubricant passageway in the bottom of said molded member within the overhang of the exposed sloping flank of the tool, and means for supplying lubricant to the clearance space between the tool and cut surface of the workpiece, which space is enclosed during cutting by the flexible seal abutting the uncut and reduced portions of the workpiece on either side of the line of cut.

5. A seal for confining a body of lubricant in close proximity to the cutting edge of a lathe tool in its traverse of a workpiece, said seal comprising a channel-like body of molded, flexible material having bottom, end and side walls fitting the end of the tool, one side wall of said seal extending forwardly beyond the end of the tool and terminating in an end wall having an arcuate surface for sealing contact with the reduced portion of the work at one side of the line of cut, said end wall extending widthwise of the tool and being integral with the bottom which extends rearwardly therefrom along the base of the tool, the opposite side wall of said seal terminating adjacent the cutting edge of the tool for edgewise sealing contact with the uncut portion of the workpiece, the bottom of the seal in the region underlying the cutting edge projecting laterally beyond the base of the tool and into sealing contact with the cut surface of the workpiece and being formed with orifice means in the portion so projecting, a rigid backing piece for securing said channel-like seal on the tool, said backing piece comprising a hollow body extending beneath and abutting the bottom of said seal to constitute an enclosed chamber with which said orifice means in the seal communicates, means for securing the backing piece in rigid relation to the tool to clamp the seal thereon, and means for supplying lubricant under pressure to such chamber and thence into the sealed space between the tool and work.

References Cited in the file of this patent

UNITED STATES PATENTS 2,354,091    Sharpe et al. _____ July 18, 1944

FOREIGN PATENTS 2,408    Great Britain _____ of 1872